(12) United States Patent
Akiyama et al.

(10) Patent No.: US 11,460,726 B2
(45) Date of Patent: Oct. 4, 2022

(54) LIQUID CRYSTAL DISPLAY DEVICE WITH IMPROVED BROKEN SOURCE LINE CORRECTION

(71) Applicant: SHARP KABUSHIKI KAISHA, Sakai (JP)

(72) Inventors: Hiroto Akiyama, Sakai (JP); Yasunao Iwata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/351,742

(22) Filed: Jun. 18, 2021

(65) Prior Publication Data

US 2021/0405412 A1  Dec. 30, 2021

Related U.S. Application Data

(60) Provisional application No. 63/046,625, filed on Jun. 30, 2020.

(51) Int. Cl.
*G02F 1/133* (2006.01)
*G09G 3/325* (2016.01)
*G02F 1/1362* (2006.01)
*G02F 1/1335* (2006.01)

(52) U.S. Cl.
CPC .... *G02F 1/13306* (2013.01); *G02F 1/133514* (2013.01); *G02F 1/136286* (2013.01); *G09G 3/325* (2013.01); *G09G 2300/0876* (2013.01); *G09G 2310/0289* (2013.01)

(58) Field of Classification Search
CPC .......... G02F 1/13306; G02F 1/133514; G02F 1/136286; G09G 3/325; G09G 2300/0876; G09G 2310/0289
See application file for complete search history.

(56) References Cited

U.S. PATENT DOCUMENTS

| | | | |
|---|---|---|---|
| 2004/0080480 A1* | 4/2004 | Zhang | G09G 3/3688 345/90 |
| 2007/0285595 A1 | 12/2007 | Hirao | |
| 2015/0221266 A1 | 8/2015 | Yoshida et al. | |
| 2018/0068615 A1* | 3/2018 | Imai | G09G 3/3225 |
| 2020/0051520 A1* | 2/2020 | Shan | G09G 3/3696 |

FOREIGN PATENT DOCUMENTS

| | | |
|---|---|---|
| JP | H08-185144 A | 7/1996 |
| JP | H11-259047 A | 9/1999 |
| JP | 2008-058337 A | 3/2008 |
| WO | 2014/042074 A1 | 3/2014 |

* cited by examiner

*Primary Examiner* — Kwang-Su Yang
(74) *Attorney, Agent, or Firm* — ScienBiziP, P.C.

(57) ABSTRACT

A liquid crystal display device includes: a display area; a non-display area; a plurality of gate lines; a plurality of source lines; a plurality of thin film transistors; a gate driver; a source driver; a control unit configured to supply a control signal to the source driver; and an auxiliary line extending in the non-display area from an end of one of the plurality of source lines to another end thereof, wherein each of the plurality of thin film transistors is turned on and off when one of the plurality of gate signals supplied to one of the plurality of gate lines connected to that thin film transistor changes to an ON voltage level and an OFF voltage level respectively, and the control signal rises at a different timing from a fall in one of the plurality of gate signals.

7 Claims, 9 Drawing Sheets

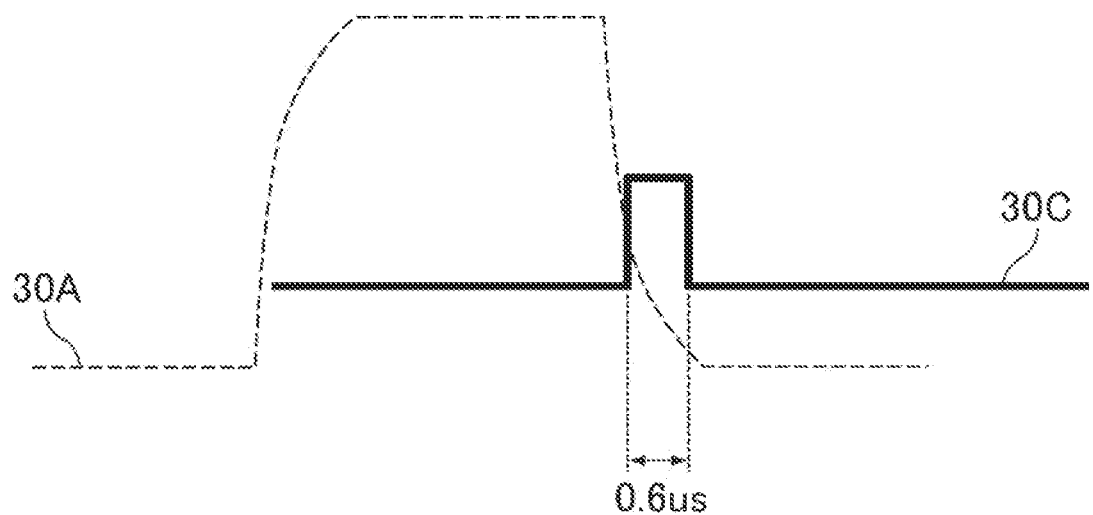
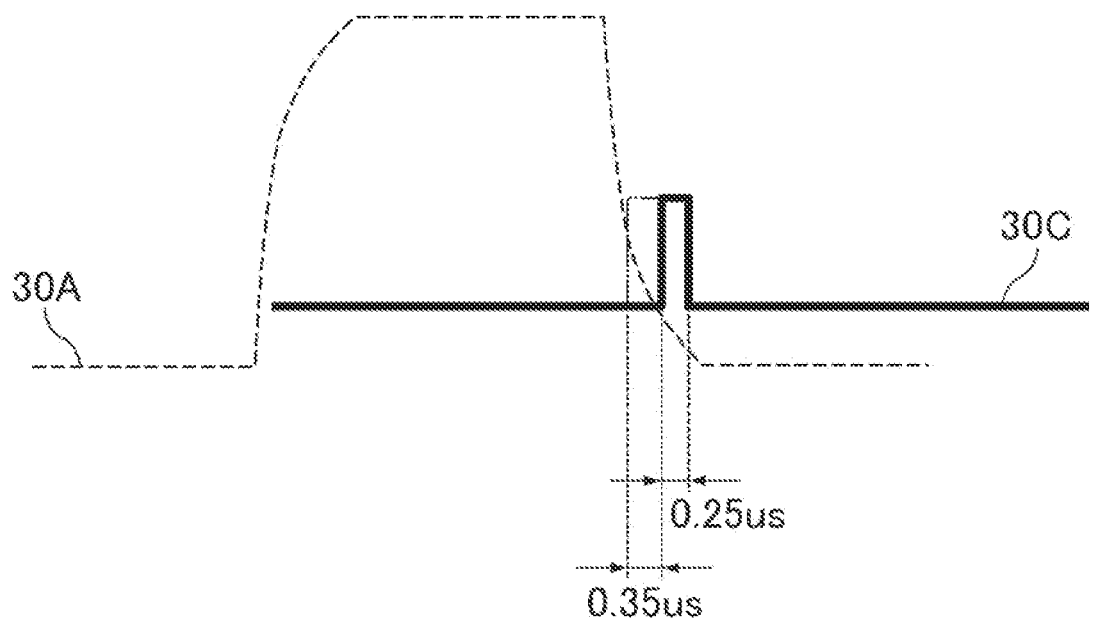

LIQUID CRYSTAL DISPLAY DEVICE WITH IMPROVED BROKEN SOURCE LINE CORRECTION

CROSS-REFERENCE TO RELATED APPLICATION

The present application claims priority from Provisional Application No. 63/046,625, the content to which is hereby incorporated by reference into this application.

BACKGROUND

1. Field

The disclosure relates to liquid crystal display devices.

2. Description of the Related Art

Liquid crystal display devices utilize a liquid crystal composition to produce a display. A typical display method for the liquid crystal display device involves projecting light from a backlight to a liquid crystal panel including: a TFT substrate including thin film transistors (TFTs); a CF substrate including a color filter (CF) and disposed opposed the TFT substrate; and a liquid crystal layer sealed between the TFT substrate and the CF substrate and further involves applying a voltage across liquid crystal molecules in the liquid crystal layer so as to change the orientation of the liquid crystal molecules, thereby controlling the quantity of transmitted light. This type of liquid crystal display device is used in a wide range of fields for the small thickness, light weight, low power consumption, and other advantageous features thereof.

The liquid crystal display device includes a matrix of pixels in a display area thereof where an image is displayed. To supply display signals to the pixels, the liquid crystal display device includes, in the display area, a plurality of gate lines extending parallel to each other and a plurality of source lines extending parallel to each other in a direction that intersects with the gate lines via an insulation film. A break in either one or both of the gate line and the source line causes the liquid crystal display device to produce an improper display because the display signals are not delivered beyond the break.

To restrain such a break in a line from causing an improper display, Japanese Unexamined Patent Application Publication, Tokukai, No. 2008-58337, taken here as an example, discloses a display device including: display-use lines to which a signal voltage is applied for a display; auxiliary lines each connectable to both ends of at least one of the display-use lines; and buffering sections each disposed between the auxiliary lines for impedance conversion on the auxiliary lines and further including auxiliary capacitors each for adjusting the waveform of the signal applied to one of the display-use lines with the auxiliary line being connected to the display-use line.

PCT International Application Publication No. WO2014/042074 discloses a liquid crystal display device including: a matrix of pixels arranged in rows and columns, each pixel including a first subpixel and a second subpixel; first TFTs and second TFTs associated with the pixels; first source bus lines connected to the first subpixels via the first TFTs and second source bus lines connected to the second subpixels via the second TFTs; an auxiliary line electrically connectable to the first source bus lines and/or the second source bus lines; and a control circuit configured to receive an input display signal representing a gray level achieved by the pixels and generate a first display signal voltage and a second display signal voltage supplied to the first subpixels and the second subpixels in the pixels for output to the first source bus lines and the second source bus lines, wherein the control circuit is capable of rendering, smaller when one of the first source bus lines or the second source bus lines that is associated with those pixels in one of the columns is electrically connected to the auxiliary line than when the one of the first source bus lines or the second source bus lines that is associated with the pixels in that column is not electrically connected to the auxiliary line, the amplitudes of the first display signal voltage and the second display signal voltage outputted to the first source bus lines and the second source bus lines that are associated with the pixels in that column.

Japanese Unexamined Patent Application Publication, Tokukaihei, No. 8-185144 discloses a liquid crystal display device including: a liquid crystal display panel including picture elements and signal lines for supplying signal voltages to drive the picture elements; and a drive circuit for applying the signal voltages to the signal lines to drive the picture elements, wherein the drive circuit includes: detection means for detecting an impedance of each signal line; and voltage correction means for correcting the voltage levels of the signal voltages applied to the signal lines in accordance with the levels detected by the detection means.

Japanese Unexamined Patent Application Publication, Tokukaihei, No. 11-259047 discloses a liquid crystal display device including: a liquid crystal display panel including picture elements and signal lines for supplying signal voltages to drive the picture elements; and a drive circuit for applying the signal voltages to the signal lines to drive the picture elements, wherein the drive circuit includes: area-specification signal generation means for generating a signal for specifying a prescribed high impedance area of the liquid crystal display panel on the basis of an externally fed signal; and voltage correction means for correcting the levels of the signal voltages applied to the signal lines on the basis of the signal for specifying the prescribed area generated by the area-specification signal generation means.

SUMMARY

FIG. 11 is a schematic plan view of a liquid crystal display device in accordance with a comparative embodiment. FIG. 12 is a diagram representing the waveforms of a gate signal, a source signal, and a control signal for the liquid crystal display device in accordance with the comparative embodiment. Referring to FIG. 11, a liquid crystal display device 1R in accordance with the comparative embodiment includes a liquid crystal panel 10 including: a TFT substrate 100; a CF substrate 200 disposed opposed the TFT substrate 100; and a liquid crystal layer 300 interposed between the TFT substrate 100 and the CF substrate 200.

The TFT substrate 100 includes: an insulating substrate; and a plurality of gate lines extending parallel to each other and a plurality of source lines 102 extending parallel to each other in a direction that intersects with the gate lines via an insulation film in a display area 10A on the insulating substrate. The gate lines and the source lines 102, when viewed as a whole, are arranged like a lattice separating the pixels. TFTs are disposed at the intersections of the gate lines and the source lines 102.

The liquid crystal display device 1R in accordance with the comparative embodiment further includes: gate drivers 110 electrically connected to the gate lines; source drivers 120 electrically connected to the source lines 102; and a control unit electrically connected to the gate drivers 110 and the source drivers 120. Referring to FIG. 12, the gate drivers 110 supply the gate lines sequentially with a gate signal 30A that toggles between an ON voltage level at which the TFT is turned on and an OFF voltage level at which the TFT is turned off under the control of the control unit. The source drivers 120 supply the source lines 102 with a source signal 30B under the control of the control unit. The voltage level of the source signal is written to each pixel at a timing when the TFT is turned on by the gate signal 30A. The control unit supplies, to the source drivers 120 via a control signal line, a control signal 30C for switching the source signal 30B by changing from the ON voltage level to the OFF voltage level.

The liquid crystal display device 1R in accordance with the comparative embodiment is a high-frequency driven liquid crystal display device and operates under the scheme where AC-like voltage that alternates between different polarities in one horizontal interval (1 H) to the next is applied to each source line 102 (source frame-reversal driving scheme).

The liquid crystal display device 1R in accordance with the comparative embodiment further includes eight auxiliary lines 11 (first to eighth auxiliary lines 11A to 11H) for correcting a break in the source lines 102 as shown in FIG. 11. The first to eighth auxiliary lines 11A to 11H are used in correcting a break in the source lines 102 in respective first to eighth display area segments 10A1 to 10A8 in the display area 10A. Each auxiliary line 11 has a first end 11XA thereof overlapping a first end 102A of the associated one of the source lines 102 and a second end 11XB thereof overlapping the other end 102B of that one of the source lines 102.

For instance, if the source line 102 in the second display area segment 10A2 has a discontinuous section X1, the break can be corrected by fusing, under a laser, an overlapping region Z10 of the first end 102A of the source line 102 having the discontinuous section X1 and the first end 11XA of the second auxiliary line 11B and an overlapping region Z20 of the second end 102B of the source line 102 having the discontinuous section X1 and the second end 11XB of the second auxiliary line 11B, so as to short-circuit the broken source line 102 and the second auxiliary line 11B. When the auxiliary line 11 includes a plurality of overlapping (intersecting) wiring sections disposed in different wiring layers, these overlapping regions are also fused under a laser. This way of correcting a break in the source line 102 however may cause a black line to appear in the region of the second auxiliary line 11B surrounded by a circular broken line in FIG. 11.

The inventors of the disclosure have investigated the causes of the black line and found the following. FIG. 13 is a diagram representing the waveforms of a gate signal and a source signal for the liquid crystal display device in accordance with the comparative embodiment. FIG. 14 is an enlarged diagram of the waveform of the source signal shown in FIG. 13.

In the liquid crystal display device 1R in accordance with the comparative embodiment, the gate signal 30A and the source signal 30B shown in FIGS. 12 to 14 are inputted to the gate line and the source line 102. Also in the liquid crystal display device 1R in accordance with the comparative embodiment, the control signal 30C is used to control the source signal 30B, and the source signal 30B is switched upon the control signal 30C changing from the ON voltage level to the OFF voltage level. The control signal 30C only functions in the source drivers 120 and is not outputted to the liquid crystal panel 10. The control signals line used in inputting the control signal 30C from the control unit to the source drivers 120 are however capacitively coupled to the source lines 102 in the source drivers 120. Monitoring the source signal 30B has revealed that this capacitive coupling induces a ripple signal, or noise, on the source signal 30B as indicated by a circular broken line in FIGS. 12 to 14.

The source signal 30B should be flat when the gate signal 30A falls while producing a gray-level display. In the liquid crystal display device 1R in accordance with the comparative embodiment, however, when the gate signal 30A falls as indicated by a circular dash-dot line in FIGS. 12 to 14, the ripple signal induced by the capacitive coupling inside the source drivers 120 is written onto the source signal 30B, causing about 100-mV noise and an undesirable voltage to the pixel. The effective value of the drain voltage is therefore higher than expected.

If no auxiliary lines 11 are used, the overall luminance does not change, which presents no disadvantages; if the auxiliary lines 11 are used, the source signal 30B experiences a smaller ripple signal owing to a delay in the section where the auxiliary lines 11 are used. A luminance difference develops, and hence a thin black line appears, between the pixel to which the source signal 30B is written via the auxiliary line 11 and the pixel to which the source signal 30B is written not via the auxiliary line 11. In other words, because the source signal 30B written via the auxiliary line 11 experiences a smaller ripple signal, a voltage difference develops between the source signal 30B written via the auxiliary line 11 and the source signal 30B written not via the auxiliary line 11. Hence, a luminance difference develops between the pixel to which the source signal 30B is written via the auxiliary line 11 and the pixel to which the source signal 30B is written not via the auxiliary line 11 and becomes visible as a black line.

FIG. 15 is an exemplary imaginary drawing of black lines that may appear if a broken source line is corrected in the liquid crystal display device in accordance with the comparative embodiment. The preceding description assumes that the source line 102 in the liquid crystal display device in accordance with the comparative embodiment has the discontinuous section X1 in the display area 10A. If the source line 102 in the liquid crystal display device in accordance with the comparative embodiment has the discontinuous section X1 in a non-display area 10B where the source drivers 120 are located as shown in FIG. 15, a black line could appear running from the non-display area 10B near the source drivers 120 toward the center of the display area 10A when the break in the source line 102 is corrected using the auxiliary line 11. In an upper part of the liquid crystal display device 1R shown in FIG. 15, those normal source lines 102 (non-discontinuous source lines 102) suffer less from the ripple signal because the source lines 102 are separated from the input section (the source drivers 120) by a distance that delays the source signal 30B. Therefore, the luminance difference is not as pronounced between those pixels connected to the normal source lines 102 and those pixels connected to the source line 102 corrected using the auxiliary line 11. In contrast, in a lower part of the liquid crystal display device 1R where the source drivers 120 are located, those pixels connected to the normal source lines 102 are affected by the ripple signal in the absence of delay and are brighter (the luminance is higher). Therefore, a luminance difference develops between those pixels connected to the normal source lines 102 and those pixels connected to the corrected source line 102 and becomes visible as a black line in the lower part of the liquid crystal display device 1R.

As described in the foregoing, in the liquid crystal display device 1R in accordance with comparative embodiment, the ripple signal induced by coupling in the source drivers 120 when the gate falls causes a difference in the effective value of the drain voltage, hence a luminance difference, between the pixel to which the source signal 30B is written via the auxiliary line 11 and the pixel to which the source signal 30B is written not via the auxiliary line 11. For these reasons, a break in the source line 102, if corrected using the auxiliary line 11, causes a black line to appear in the liquid crystal display device 1R in accordance with comparative embodiment 1.

All the technology described in Japanese Unexamined Patent Application Publication, Tokukai, No. 2008-58337, PCT International Application Publication No. WO2014/042074, Japanese Unexamined Patent Application Publication, Tokukaihei, No. 8-185144, and Japanese Unexamined Patent Application Publication, Tokukaihei, No. 11-259047 corrects the voltage applied to the source lines so as to restrain the improper display that may occur if a broken source line is corrected using an auxiliary line. None of Japanese Unexamined Patent Application Publication, Tokukai, No. 2008-58337, PCT International Application Publication No. WO2014/042074, Japanese Unexamined Patent Application Publication, Tokukaihei, No. 8-185144, and Japanese Unexamined Patent Application Publication, Tokukaihei, No. 11-259047 discloses any other method. There is room for improvement.

The disclosure has been made in view of these issues and has an object to provide a liquid crystal display device that can restrain the improper display that may occur if a broken source line is corrected using an auxiliary line.

SOLUTION TO PROBLEM (1) The disclosure, in an embodiment thereof, is directed to a liquid crystal display device including: a display area in which there is provided a matrix of pixels; a non-display area around the display area; a plurality of gate lines extending along respective rows of pixels; a plurality of source lines extending along respective columns of pixels in a direction that intersects with the plurality of gate lines; a plurality of thin film transistors, one for each pixel, connected respectively to the plurality of gate lines and the plurality of source lines; a gate driver connected to the plurality of gate lines to sequentially supply a plurality of gate signals to the plurality of gate lines; a source driver connected to an end of each of the plurality of source lines to supply a plurality of source signals to the plurality of source lines respectively; a control unit configured to supply a control signal to the source driver via a control signal line, the control signal being a pulse signal for switching the plurality of source signals; and an auxiliary line extending in the non-display area from an end of one of the plurality of source lines to another end thereof, wherein each of the plurality of thin film transistors is turned on and off when one of the plurality of gate signals supplied to one of the plurality of gate lines connected to that thin film transistor changes to an ON voltage level and an OFF voltage level respectively, and the control signal rises at a different timing from a fall in one of the plurality of gate signals.

(2) In another embodiment of the disclosure, the liquid crystal display device configured as described in (1) is further configured such that the control signal reaches half an amplitude thereof while rising at a different timing from a timing when one of the plurality of gate signals reaches half an amplitude thereof while falling.

(3) In another embodiment of the disclosure, the liquid crystal display device configured as described in (1) or (2) is further configured such that the control signal rises at a timing outside a gate falling period in which one of the plurality of gate signals changes from the ON voltage level to the OFF voltage level.

(4) In another embodiment of the disclosure, the liquid crystal display device configured as described in (3) is further configured such that the control signal changes to the ON voltage level in a period outside the gate falling period.

(5) In another embodiment of the disclosure, the liquid crystal display device configured as described in any one of (1), (2), (3) and (4) is further configured such that each of the plurality of source signals is switched between voltage levels in response to the control signal changing from the ON voltage level to the OFF voltage level.

(6) In another embodiment of the disclosure, the liquid crystal display device configured as described in (5) is further configured such that each of the plurality of source signals changes from a voltage level written to those pixels in an n-th one of the rows to a voltage level written to those pixels in an (n+1)-th one of the rows in response to the control signal rising and then falling after a fall in one of the plurality of gate signals supplied to one of the plurality of gate lines for the n-th row, where n is a natural number.

(7) In another embodiment of the disclosure, the liquid crystal display device configured as described in any one of (1), (2), (3), (4), (5) and (6) is further configured such that the control signal line is capacitively coupled to the plurality of source lines.

The disclosure provides a liquid crystal display device that can restrain an improper display that may occur if a broken source line is corrected using an auxiliary line.

BRIEF DESCRIPTION OF DRAWINGS

FIG. 6 is a diagram representing exemplary waveforms of a gate signal and a control signal for a liquid crystal display device in accordance with a comparative embodiment.

FIG. 7 is a diagram representing exemplary waveforms of a gate signal and a control signal for a liquid crystal display device in accordance with an embodiment.

DETAILED DESCRIPTION

The following will describe embodiments of the present invention. The present invention is not limited to the following description of embodiments and may be redesigned where appropriate in such a manner as to provide the essential features of the present invention. The features disclosed in the embodiments may be combined and/or altered where appropriate without departing from the scope of the present invention.

Embodiment 1

Figure 1:
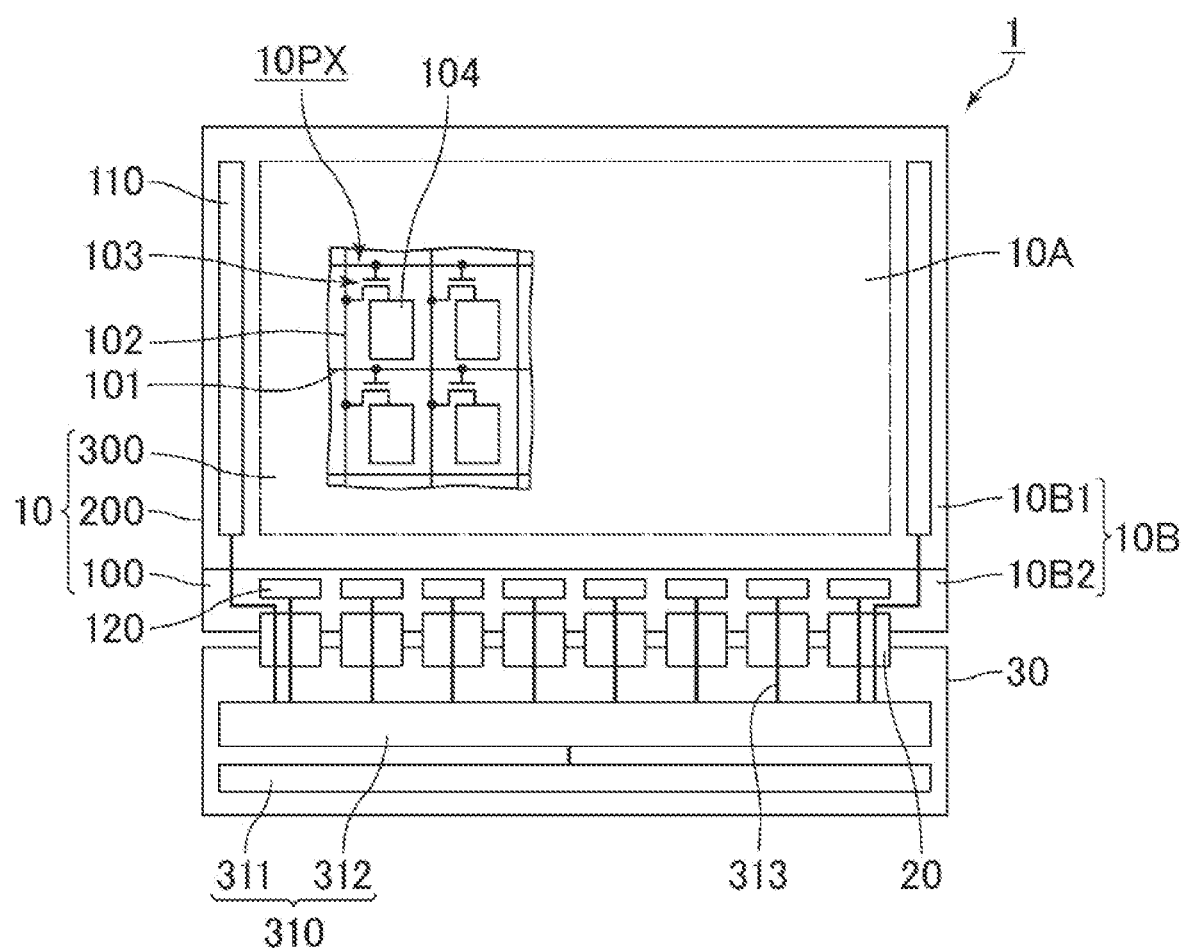
FIG. 1 is a schematic plan view of a liquid crystal display device in accordance with an embodiment.
Figure 2:
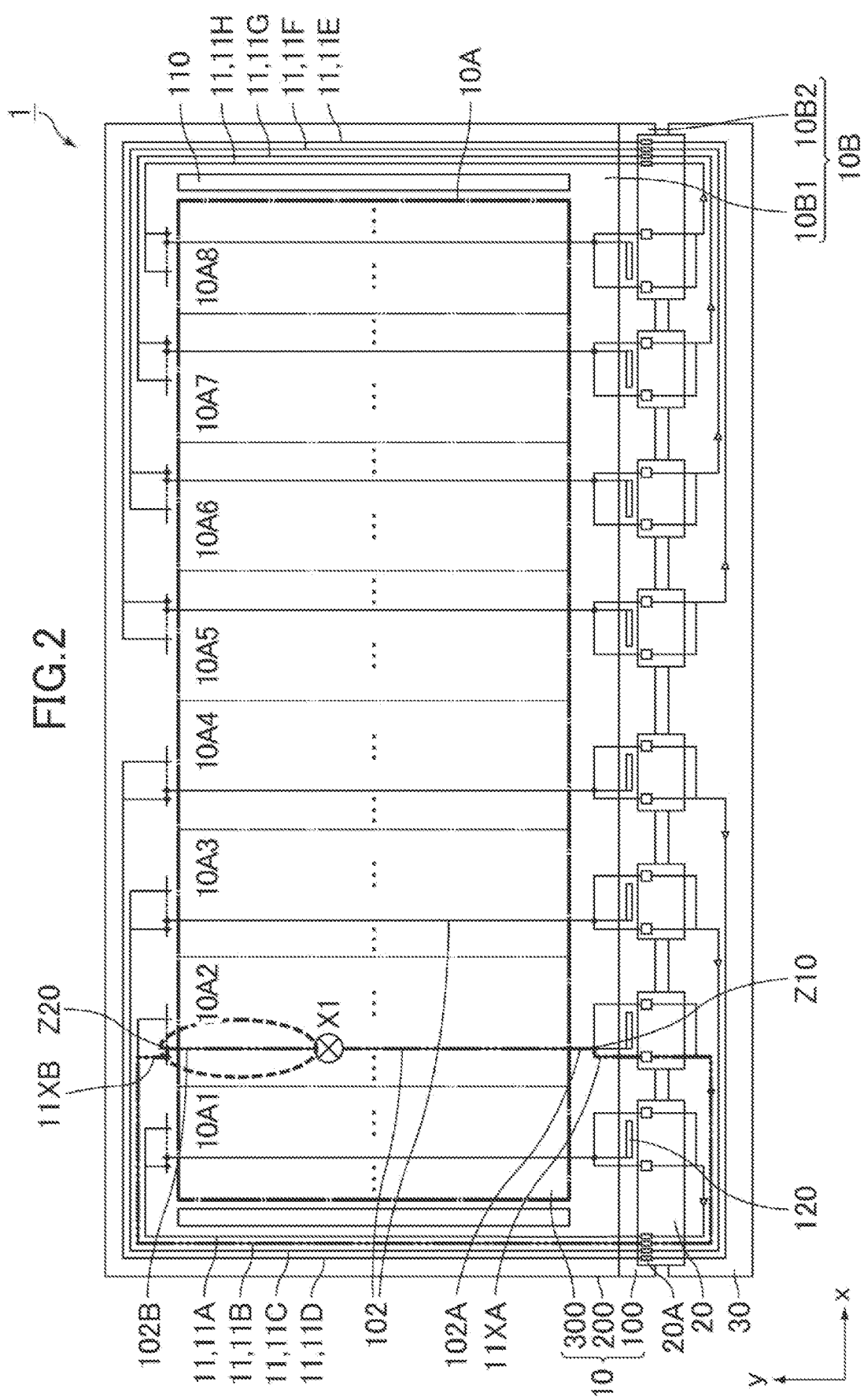
FIG. 2 is a schematic plan view of a wiring structure of the liquid crystal display device in accordance with the embodiment.
Figure 3:
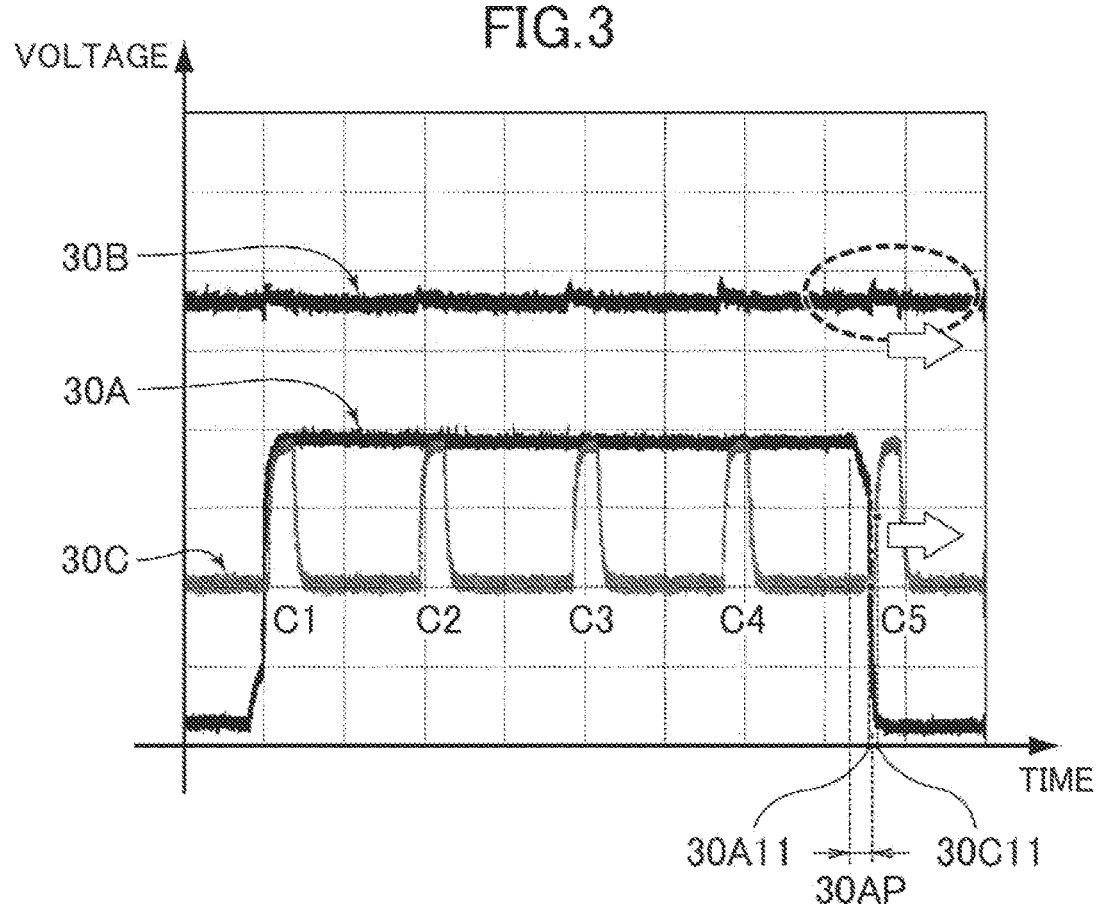
FIG. 3 is a diagram representing the waveforms of a gate signal, a source signal, and a control signal for the liquid crystal display device in accordance with the embodiment.

FIG. 1 is a schematic plan view of a liquid crystal display device in accordance with an embodiment. FIG. 2 is a schematic plan view of a wiring structure of the liquid crystal display device in accordance with the embodiment. FIG. 3 is a diagram representing the waveforms of a gate signal, a source signal, and a control signal for the liquid crystal display device in accordance with the embodiment.

Referring to FIG. 1, a liquid crystal display device 1 in accordance with the present embodiment includes: a liquid crystal panel (display panel) 10 having a display screen where images are displayed; a backlight device disposed behind the liquid crystal panel 10 to project light to produce a display on the liquid crystal panel 10; a plurality of flexible substrates 20 connected to an edge of the liquid crystal panel 10; and a printed board 30 connected to the flexible substrates 20. The flexible substrates 20 and the printed board 30 are connected either directly or indirectly to the liquid crystal panel 10 to form a single modular component. The flexible substrates 20 and the printed board 30, along with the liquid crystal panel 10, make up the liquid crystal display device 1. There are also provided anisotropic conductive films (ACFs), one at each place where the liquid crystal panel 10 is connected to the flexible substrates 20 and each place where the flexible substrates 20 are connected to the printed board 30.

The liquid crystal panel 10, as shown in FIG. 1, includes: a TFT substrate 100 including thin film transistors (TFTs) 103; a CF substrate 200 opposite the TFT substrate 100, the CF substrate 200 including a color filter (CF); and a liquid crystal layer 300 between the TFT substrate 100 and the CF substrate 200.

The liquid crystal panel 10 includes a matrix of pixels 10PX and is divided into a display area (active area) 10A where images can be displayed and a non-display area (non-active area) 10B where no images can be displayed. The display area 10A is surrounded by the non-display area 10B. In the liquid crystal panel 10, the display area 10A is located off the center, closer to a first edge portion (upper side in FIG. 1) with respect to the short-side direction thereof. The non-display area 10B includes: a substantially frame-shaped region 10B1 surrounding the display area 10A; and a terminal edge 10B2 on a second edge portion (lower side in FIG. 1) with respect to the short-side direction thereof. There are provided terminals in the terminal edge 10B2. The substantially frame-shaped region 10B1 is a frame portion including a frame-shaped sealing section. The terminal edge 10B2 is an exposed part of the TFT substrate 100 that does not underlie the CF substrate 200. In FIG. 1, a dash-dot line indicates the outline of the display area 10A, and the non-display area 10B lies outside the dash-dot line.

Referring to FIG. 1, the TFT substrate 100 includes a plurality of monolithic gate drivers 110 (two monolithic gate drivers 110 in the present embodiment) in the substantially frame-shaped region 10B1 to the right and left of the display area 10A. The gate drivers 110 are provided on a glass substrate in the manufacture of the TFT substrate 100 and alternatively referred to as the gate driver monolithic circuits (GDM circuits). The gate lines 101 for odd-numbered rows are connected to one of the gate drivers 110 located to one of the right and left sides of the display area 10A. The gate lines 101 for even-numbered rows are connected to the other one of the gate drivers 110 located to the other one of the right and left sides of the display area 10A. The gate drivers 110 supply a gate signal to the gate lines 101 sequentially, starting with the gate line 101 for the first row and finishing with the gate line 101 for the last row.

The TFT substrate 100 includes a plurality of source drivers 120 (eight source drivers 120 in the present embodiment) on the terminal edge 10B2 of the non-display area 10B below the display area 10A. The source drivers 120 are attached directly onto the TFT substrate 100 and connected via an ACF. Each source line 102 is connected to one of the source drivers 120 disposed on the terminal edge 10B2. The source drivers 120 supply a source signal to the numerous source lines. The source drivers 120 switch the source signal at a timing controlled through a control signal (alternatively referred to as an i-STB signal). Specifically, the source signal is switched from one voltage level to another in response to the control signal changing from an ON voltage level to an OFF voltage level.

Referring to FIGS. 1 to 3, the liquid crystal display device 1 in accordance with the present embodiment includes: the display area 10A in which the matrix of pixels 10PX is provided; the non-display area 10B surrounding the display area 10A; the plurality of gate lines 101 extending along those pixels 10PX in the respective rows; the plurality of source lines 102 extending along those pixels 10PX in the respective columns in a direction that intersects with the plurality of gate lines 101; the plurality of TFTs 103, one for each pixel 10PX, connected to the plurality of gate lines 101 and the plurality of source lines 102; the gate driver 110 connected to the plurality of gate lines 101 to sequentially supply a plurality of gate signals 30A to the plurality of gate lines 101; the source driver 120 connected to a first end 102A of each of the plurality of source lines 102 to supply a plurality of source signals 30B to the plurality of source lines 102 respectively; a control unit 310 configured to supply a control signal 30C to the source driver 120 via a control signal line 313, the control signal 30C being a pulse signal for switching the plurality of source signals 30B; and the auxiliary line 11 extending the non-display area 10B from the first end 102A of each of the plurality of source lines 102 to a second end 102B thereof, wherein each of the plurality of TFTs 103 is turned on and off when the gate signal 30A supplied to the gate line 101 connected to that TFT 103 goes to the ON voltage level and the OFF voltage level respectively.

In this context, the TFT is "turned off" when no current flows between the source electrode and the drain electrode of the TFT and "turned on" when a non-zero current flows between the source electrode and the drain electrode of the TFT.

The control signal 30C in the liquid crystal display device 1 in accordance with the present embodiment rises at a different timing from the fall in the gate signal 30A. The voltage level written to the pixel 10PX is eventually dictated by the source signal 30B fed to the TFT 103. In other words, the source signal 30B is written to the pixel 10PX when the gate signal 30A falls from the ON voltage level to the OFF voltage level. In addition, the control signal line 313, used when the control signal 30C is inputted, is capacitively coupled with the source line 102 in the source driver 120. A ripple signal induced by the capacitive coupling is therefore superimposed on the source signal 30B when the control signal 30C rises from the OFF voltage level to the ON voltage level as indicated by a circular broken line in FIG. 3. Accordingly, in the present embodiment, the control signal 30C rises at a different timing from the fall in the gate signal 30A, so that the gate signal 30A can fall at a different timing from a timing when the ripple signal induced by the capacitive coupling between the source line 102 and the control signal line 313 is superimposed on the source signal 30B. That can restrain the source signal 30B with the ripple signal superimposed thereon from being written to the pixel 10PX. Consequently, the ripple signal can be restrained from causing a difference in the effective value of the drain voltage, hence in luminance, between the pixel 10PX connected to the broken source line 102 corrected using the auxiliary line 11 and the pixel 10PX connected to the normal source line 102. Occurrence of the black line can be therefore restrained when the broken source line is corrected. The improper display can be restrained from occurring when the broken source line is corrected using an auxiliary line.

The present embodiment prevents the noise (ripple signal) on the source signal 30B from coinciding with the fall in the gate signal 30A, by delaying the rise in the control signal 30C from the OFF voltage level to the ON voltage level relative to the fall in the gate signal 30A from the ON voltage level to the OFF voltage level. The present embodiment can hence prevent recharging by the ripple signal upon the fall in the gate signal 30A, restrain occurrence of the black line, and restrain occurrence of the improper display when a break in the source line 102 is corrected using the auxiliary line 11. No black line will appear if the ripple signal is prevented inside the source driver 120. To do so, however, a circuit such as a decoupling capacitor is needed, which increases cast. In contrast, the present embodiment can restrain occurrence of the black line less expensively than the provision of a circuit such as a decoupling capacitor, by delaying the rise in the control signal 30C relative to the fall in the gate signal 30A.

Figure 15:
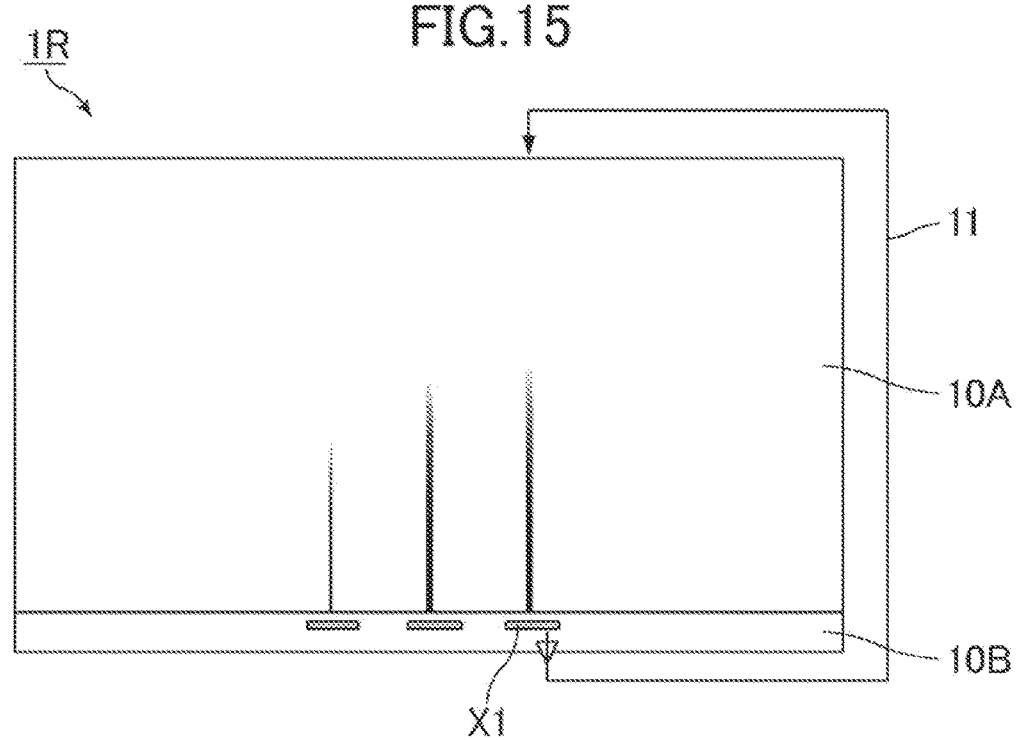
FIG. 15 is an exemplary imaginary drawing of black lines that may appear if a broken source line is corrected in the liquid crystal display device in accordance with the comparative embodiment.

In the liquid crystal display device in accordance with the comparative embodiment shown in FIG. 15, the black line exhibits the intended luminance. Applying the present embodiment makes it possible to render the voltage level of the source signal 30B recharged by the ripple signal to be equivalent to that of the black line. The present embodiment enables the intended voltage of the source signal 30B to be applied to the pixel. The following will describe the present embodiment in more detail.

The control signal 30C is a pulse signal for switching the source signal 30B from the voltage level fed to the pixels 10PX in each row to the voltage level fed to the next row. The source signal 30B is switched when the control signal 30C is switched from the ON voltage level to the OFF voltage level.

The frequency of the control signal 30C changes with the panel drive frequency of the liquid crystal display device 1. For instance, when the panel drive frequency is 60 Hz, the control signal 30C has a frequency of 88.38 kHz; when the panel drive frequency is 120 Hz, the control signal 30C has a frequency of 176.76 kHz; and when the panel drive frequency is 180 Hz, the control signal 30C has a frequency of 265.14 kHz. Occurrence of an improper display when a break in the source line is corrected using an auxiliary line can be restrained regardless of whether the panel drive frequency is 60 Hz, 120 Hz, or 180 Hz.

The duty ratio of the control signal 30C is not limited in any particular manner. For example, when the panel drive frequency is 120 Hz and the control signal 30C has an ON voltage period of 200 ns, the duty ratio is 3.53%; when the panel drive frequency is 120 Hz and the control signal 30C has an ON voltage period of 250 ns, the duty ratio is 4.42%; when the panel drive frequency is 120 Hz and the control signal 30C has an ON voltage period of 600 ns, the duty ratio is 10.64%; and when the panel drive frequency is 120 Hz and the control signal 30C has an ON voltage period of 824 ns, the duty ratio is 14.49%.

The OFF voltage level and the ON voltage level of the control signal 30C are not limited in any particular manner. For example, the control signal 30C may have an OFF voltage level of 0 volts and an ON voltage level of 1.8 volts.

The ON voltage level and the OFF voltage level of the gate signal 30A are not limited in any particular manner. For example, the gate signal 30A may have an ON voltage level of 28.0 volts, an OFF voltage level of −7.0 volts, and a peak voltage of 35 volts. The ON voltage level and the OFF voltage level of the gate signal 30A however change relatively with the voltage level Vcom of a common electrode. The specific values of the ON voltage level and the OFF voltage level of the gate signal are given here assuming that the voltage level Vcom of the common signal is centered approximately at 5.0 volts.

In the liquid crystal display device 1 in accordance with the present embodiment, the control signal 30C rises at a different timing from the fall in the gate signal 30A. The timing of the fall in the gate signal 30A refers to the timing when the gate signal 30A changes from the ON voltage level to the OFF voltage level. A rise in the control signal 30C refers to a change of the control signal 30C from the OFF voltage level to the ON voltage level.

The timing of a rise/fall in the gate signal 30A can be directly measured from the waveform of the gate signal 30A outputted from the gate driver 110 to the display area 10A by, for example, cutting and fusing an internal wiring line of the panel with a laser. In addition, the overall frequency timing of the gate signal 30A is controlled by a clock signal outputted from a timing controller 311 on the printed board 30 (hereinafter, may be referred to as a "GCK"). Because the delays of the GCK and the gate signal 30A in the liquid crystal display device 1 are generally negligible, the GCK is switched between the ON voltage level and the OFF voltage level substantially at the same timing as the gate signal 30A and has substantially the same waveform as the gate signal 30A. Therefore, the GCK may be monitored on the printed board 30 using an oscilloscope to measure a rise/fall in the GCK, so that the timing of that rise/fall can be used as the timing of a rise/fall in the gate signal 30A.

The control signal 30C is fed from the timing controller 311 to the source driver 120. The effect of the delay of the control signal 30C is substantially negligible in the liquid crystal display device 1. The timing of a rise/fall in the control signal 30C can be measured through monitoring using an oscilloscope and pad wiring drawn out of the printed board 30 to which the timing controller 311 is mounted. The control signal 30C is not outputted to the display area 10A, but a ripple signal is observable on a source signal 102 in synchronism with the control signal 30C (without a delay from the control signal 30C).

To change the timing and waveform of the gate signal 30A, the timing and waveform of the GCK is changed. The timing and waveform of the GCK and the control signal 30C can be changed by rewriting the register value for the EPROM and EEPROM in the timing controller 311 on a PC.

More specifically, for example, as shown in FIG. 3, a timing 30C11 when the control signal 30C reaches half the amplitude thereof while rising does not coincide with a timing 30A11 when the gate signal 30A reaches half the amplitude thereof while falling. The timing 30C11 When the control signal 30C reaches half the amplitude thereof while rising is a timing when the control signal 30C reaches the average of the ON voltage level and the OFF voltage level thereof while changing from the OFF voltage level to the ON voltage level. The timing 30A11 when the gate signal 30A reaches half the amplitude thereof while falling is a timing when the gate signal 30A reaches the average of the ON voltage level and the OFF voltage level thereof while changing from the ON voltage level to the OFF voltage level.

Additionally, for example, as shown in FIG. 3, the control signal 30C rises (starts rising) at a timing outside a gate falling period 30AP in which the gate signal 30A changes from the ON voltage level to the OFF voltage level. The gate falling period 30AP in which the gate signal 30A changes from the ON voltage level to the OFF voltage level is a period from the moment when the gate signal 30A starts falling from the ON voltage level toward the OFF voltage level to the moment when the gate signal 30A completely falls to the OFF voltage level. The timing outside the gate falling period 30AP in which the gate signal 30A changes from the ON voltage level to the OFF voltage level is, for example, a period in which the gate signal 30A is at the OFF voltage level, a gate rising period in which the gate signal changes from the OFF voltage level to the ON voltage level, or a period in which the gate signal is at the ON voltage level.

The control signal 30C changes to the ON voltage level in a period outside the gate falling period 30AP. In other words, the entire period in which the control signal 30C changes to the ON voltage level does not overlap the gate falling period 30AP. Referring to FIG. 3, the ripple signal is a maximum when the control signal 30C rises and then continuously present while the control signal is at the ON voltage level. In the above arrangement, the control signal 30C changes to the ON voltage level in a period outside the gate falling period 30AP. The gate signal 30A can be hence prevented from falling not only at a timing when the ripple signal is a maximum, but also throughout the period in which the ripple signal is present. That in turn can better restrain the source signal 30B with the ripple signal superimposed thereon from being written to the pixel 10PX. Occurrence of the black line can be better restrained when the broken source line is corrected. The period outside the gate falling period 30AP when the control signal 30C changes to the ON voltage level is, for example, a period in which the gate signal 30A is at the OFF voltage level, a gate rising period in which the gate signal changes from the OFF voltage level to the ON voltage level, and a period when the gate signal is at the ON voltage level.

The source signal 30B is switched between voltage levels in response to the control signal 30C changing from the ON voltage level to the OFF voltage level. In other words, the source signal 30B is switched between voltage levels at a timing when the control signal 30C falls. More specifically, as the gate signal 30A is fed to the gate lines 101 sequentially, starting with the gate line 101 for the first row and progressing toward the gate line 101 for the (n+1)-th row (n is a natural number), the source signal 30B changes from the voltage level written to the pixels 10PX in the n-th row to the voltage level written to the pixels 10PX in the (n+1)-th row, in response to the control signal 30C rising and falling following a fall in the gate signal 30A supplied the gate lines 101 for the n-th row. In this arrangement, the gate signal 30A goes to the OFF voltage level, and the pixels 10PX in the n-th. row can be charged with no ripple signal superimposed, while the source signal 30B is at a voltage level written to the pixels 10PX in the n-th row. In addition, after the gate signal 30A falls to the OFF voltage level, the control signal 30C rises and falls, and the source signal 30B changes to a voltage level written to the pixels 10PX in the (n+1)-th row. The arrangement can hence both restrain the ripple signal from being superimposed on the source signal 30B and restrain the voltage level of the source signal 30B that should be written to the pixels 10PX in the (n+1)-th row from being written to the pixels 10PX in the n-th row.

FIG. 3 shows that the control signal 30C is at the ON voltage level in the order of a first period C1, a second period C2, a third period C3, a fourth period C4, and a fifth period C5 and at the OFF voltage level throughout the other periods. In this situation, the voltage level of the source signal 30B written eventually to the pixels 10PX to which the gate signal 30A is supplied in FIG. 3 is the voltage level of the source signal 30B at a timing when the control signal 30C falls from the ON voltage level to the OFF voltage level in the period C4 immediately prior to a fall in the gate signal 30A. The voltage level of the source signal 30B established in the period C4 is eventually written to the pixels 10PX no matter what voltage level the source signal 30B may have in the periods C1 to C3.

The waveform of the gate signal is increasingly delayed as it travels farther away from the input section, which in turn induces a feed-through voltage difference and causes in-plane flicker. Accordingly, in the present embodiment, the gate signal 30A is given a slope-like falling waveform in advance. The slope has a width that is determined in a suitable manner in view of the pixel count and screen size of the liquid crystal panel. The width is adjusted, for example, so as to generate a feed-through voltage difference of approximately 100 mV.

Figure 4:
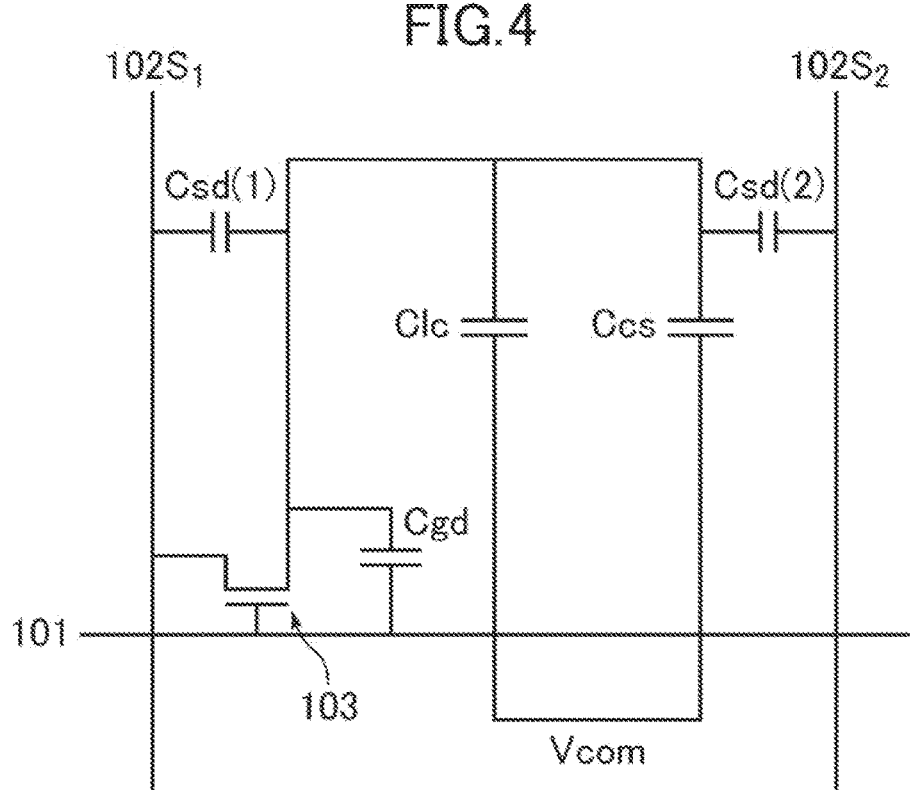
FIG. 4 is a circuit diagram illustrating the capacitance of a pixel section in a liquid crystal display device in accordance with an embodiment.

A description is now given of the feed-through voltage. FIG. 4 is a circuit diagram illustrating the capacitance of a pixel section in a liquid crystal display device in accordance with an embodiment. As shown in FIG. 4, in the liquid crystal display device 1 in accordance with the present embodiment, the gate line 101 intersects with a first source line $102S_1$ and a second source line $102S_2$. There are formed a capacitor Cgd between the drain voltage level and the gate line 101, a capacitor Clc between the drain voltage level and the liquid crystal layer 300, a capacitor Ccs between the drain voltage level and an auxiliary capacitor Cs, a capacitor Csd(1) between the drain voltage level and the first source line 102S$_1$, and a capacitor Csd(2) between the drain voltage level and the second source line 102S$_2$. If the gate signal 30A has an ideal rectangular waveform, the TFT 103 connected to the first source line 102S$_1$ has a drain voltage level Vd that satisfies Eq. 1 below in relation to a voltage Vs on the first source line 102S$_1$:

$$Vd = Vs - A \qquad \text{(Eq. 1)}$$

where A=Cgd/(Cgd+Clc+Ccs+Csd(1)+Csd(2))×(Vgh−Vgl), and Vgh and Vgl denote the ON voltage level and the OFF voltage level of the gate signal 30A respectively.

"A" in Eq. 1 is the feed-through voltage.

Figure 5:
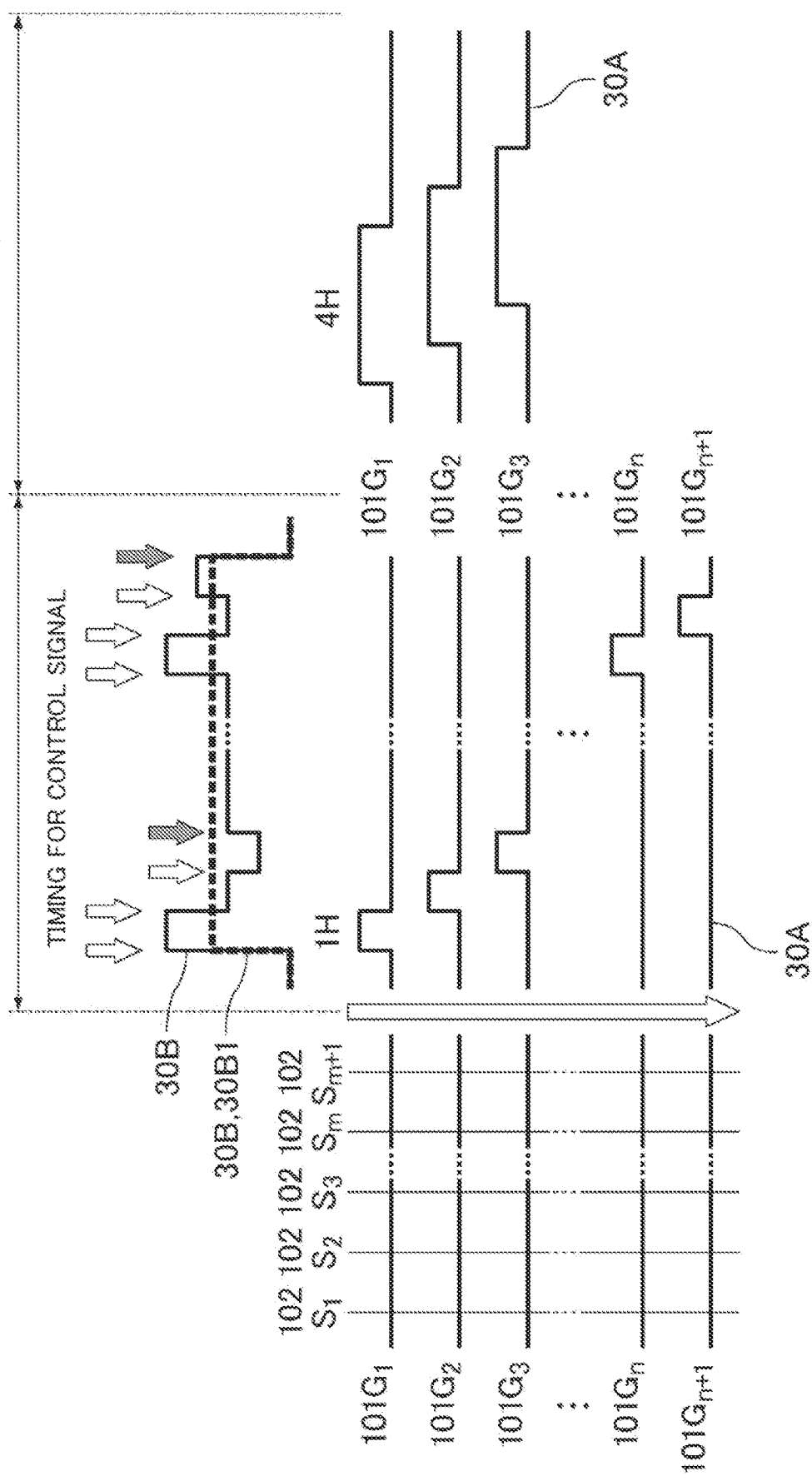
FIG. 5 is a diagram representing a gate signal, a source signal, and a control signal being inputted in a liquid crystal display device in accordance with an embodiment.

FIG. 5 is a diagram representing a gate signal, a source signal, and a control signal being inputted in a liquid crystal display device in accordance with an embodiment. Referring to FIG. 5, the gate driver 110 supplies the gate signal 30A sequentially to the gate lines, starting with the gate lines 101G$_1$ in the first row and progressing toward the gate lines 101G$_{n+1}$ in the (n+1)-th row under the control of the control unit 310. The control signal 30C rises at a timing when the gate signal 30A rises, in response to which the source signal 30B is switched between voltage levels such that the source signal 30B can be fed to the source lines, starting with the source line 102S$_1$ in the first column and finishing with a source line 102S$_{m+1}$ in the (m+1)-th column (m is a natural number). The source signal 30B is switched between voltage levels in response to the control signal 30C changing from the ON voltage level to the OFF voltage level. FIG. 5 also shows an exemplary source signal 30B1 in producing a gray-level monotonous display.

Traditionally, the gate signal 30A rises in each horizontal interval (H). However, doing so at increased rates will place a huge workload on a GDM circuit in the liquid crystal panel 10. The gate signal 30A accordingly is held at the ON voltage level over two or more horizontal intervals. For instance, the gate signal 30A may be held at the ON voltage level over four horizontal intervals as in the present embodiment or over two horizontal intervals. If the gate signal 30A is at the ON voltage level in a single horizontal interval, since the voltage level written to the pixel 10PX is established by the voltage level of the eventually inputted source signal 30B, the voltage level of the source signal 30B fed to the pixel 10PX is established at a timing when the control signal 30C changes to the ON voltage level in the single horizontal interval. On the other hand, if the gate signal 30A is held at the ON voltage level over four horizontal intervals as in the present embodiment, the voltage level of the source signal 30B fed to the pixel 10PX is established at a timing when the control signal 30C changes to the ON voltage level in the fourth horizontal interval. In other words, the voltage level of the source signal 30B at a timing indicated by a black arrow, not by a white arrow, in FIG. 5 is written to the pixel 10PX.

In the recent generation of liquid crystal panels, TFTs have a high semiconductor mobility and charge/discharge very quickly. The source signal is fed to the TFT immediately before the gate signal falls. The source signal when the gate signal is at the ON voltage level therefore does not affect much until the gate signal falls. When the gate signal falls, however, a delay occurs, which results in a slope-like waveform. If there are fluctuations in the source signal in this portion, the source signal written to the pixel is significantly affected. In the liquid crystal panel incorporating a high mobility semiconductor, since the source signal when the gate signal falls is written to the pixel as described here, it is preferable that the source signal have no fluctuations when the gate signal falls.

In the liquid crystal display device 1 in accordance with the present embodiment, the control signal 30C rises at a different timing from the fall in the gate signal 30A. In other words, the gate signal 30A falls not at a timing when the ripple signal induced by the capacitive coupling between the source line 102 and the control signal line 313 is superimposed on the source signal 30B. This arrangement can efficiently restrain occurrence of the black line in the liquid crystal display device incorporating a high mobility semiconductor. Additionally, because the source line 102 corrected using the auxiliary line 11 places an increasingly large load on the source signal 30B with an increasing size of the liquid crystal panel 10, the arrangement can efficiently restrain occurrence of the black line, for example, in 27-inch or larger liquid crystal panels.

Figure 12:
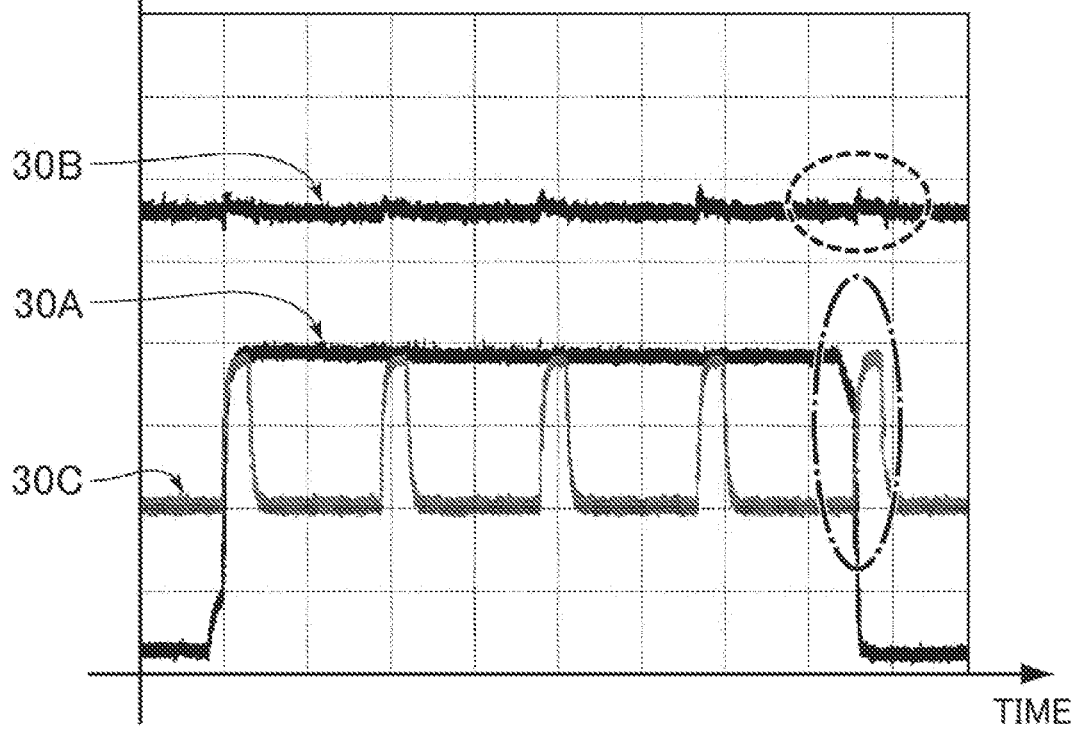
FIG. 12 is a diagram representing the waveforms of a gate signal, a source signal, and a control signal for the liquid crystal display device in accordance with the comparative embodiment.
Figure 13:
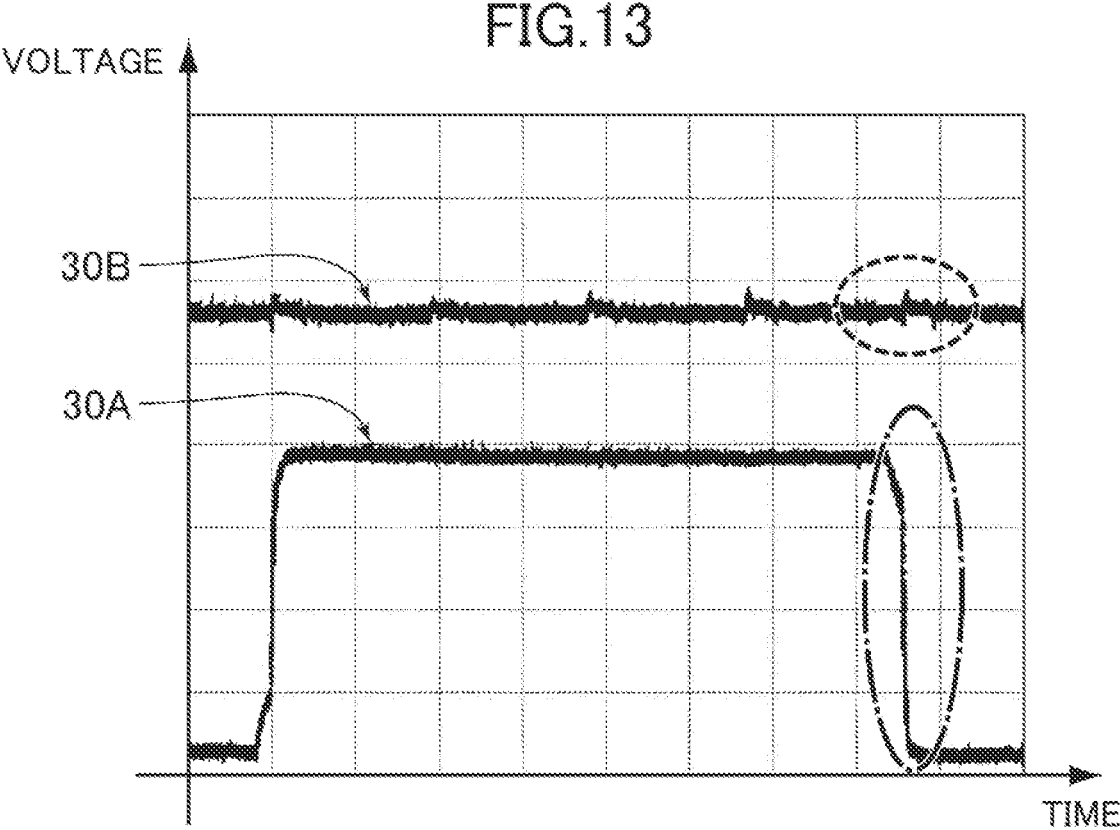
FIG. 13 is a diagram representing the waveforms of a gate signal and a source signal for the liquid crystal display device in accordance with the comparative embodiment.
Figure 14:
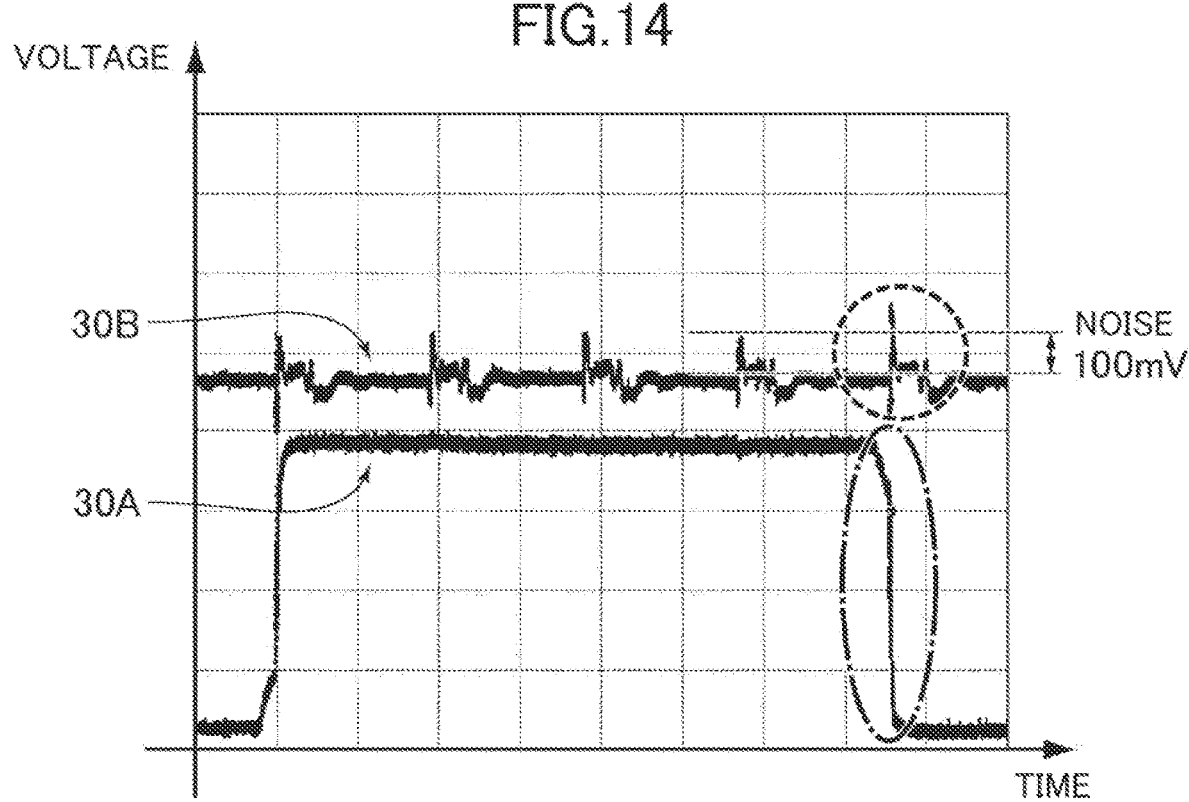
FIG. 14 is an enlarged diagram of the waveform of the source signal shown in FIG. 13.

In the present embodiment in comparison specifically with the liquid crystal display device in accordance with the comparative embodiment, either the entire control signal 30C is intentionally delayed (the entire control signal 30C is shifted rightwards relative to that shown in FIG. 12) or the control signal 30C is rendered to rise with a delay, so as to cut short the period in which the control signal 30C is fed (to cut short the width of the control signal 30C). By doing so, the control signal 30C can be made to rise at a different timing from the fall in the gate signal 30A.

FIG. 6 is a diagram representing exemplary waveforms of a gate signal and a control signal for a liquid crystal display device in accordance with a comparative embodiment. FIG. 7 is a diagram representing exemplary waveforms of a gate signal and a control signal for a liquid crystal display device in accordance with an embodiment. For instance, when the liquid crystal display device in accordance with the comparative embodiment has a panel drive frequency of 180 Hz, the control signal 30C is held at the ON voltage level for 0.6 µs and starts to be held at the ON voltage level when the gate signal 30A reaches half the amplitude thereof while falling, in the liquid crystal display device in accordance with the comparative embodiment as shown in FIG. 6. Under these conditions, a black line appears when a broken source line is corrected using an auxiliary line.

In contrast, in the present embodiment, when the liquid crystal display device has a panel drive frequency of 180 Hz, the control signal 30C starts to be held at the ON voltage level with a delay of 0.35 µs, but ends to be held at the ON voltage level at the original timing so that the control signal 30C can be at the ON voltage level for a shorter period of 0.25 µs, as shown in FIG. 7. Under these conditions, no black line appears when a broken source line is corrected using an auxiliary line because the control signal 30C rises at a different timing from the fall in the gate signal 30A. More specifically, the control signal 30C may start to be held at the ON voltage level at a different timing from a timing when the gate signal 30A reaches half the amplitude thereof while falling.

In FIG. 7, the gate signal 30A supplied to the gate line 101 for the n-th row starts to fall and reaches half the amplitude thereof before the control signal 30C rises and falls, so that the source signal 30B can change from the voltage level written to the pixels 10PX in the n-th row to the voltage level written to the pixels in the (n+1)-th row. In FIG. 7, since the control signal 30C rises before the gate signal 30A completely falls, a ripple signal may be superimposed on the source signal 30B written to the pixels 10PX. However, since the gate signal 30A reaches half the amplitude thereof before the control signal 30C rises, the voltage level written to the pixels 10PX is reduced to a practically negligible level. Luminance difference is therefore practically negligible between the pixel 10PX to which the source signal 30B is fed via the auxiliary line 11 and the pixel 10PX to which the source signal 30B is written not via the auxiliary line 11.

Likewise, if the entire control signal 30C is intentionally delayed by from 0.08 μs to 0.28 μs (but the control signal 30C is held at the ON voltage level for the original period of 0.6 μs) in comparison with the liquid crystal display device in accordance with comparative embodiment 1, no black line appears when a broken source line is corrected using an auxiliary line.

Likewise, if the control signal 30C starts to be held at the ON voltage level with a delay of 0.12 μs and ends to be held at the ON voltage level 0.05 μs earlier, so that the control signal 30C can be held at the ON voltage level for a shorter period of 0.43 μs, no black line appears when a broken source line is corrected using an auxiliary line.

Likewise, if the control signal 30C starts to be held at the ON voltage level with a delay of 0.12 μs and ends to be held at the ON voltage level with a delay of 0.344 μs, so that the control signal 30C can be held at the ON voltage level for an extended period of 0.824 μs, no black line appears when a broken source line is corrected using an auxiliary line.

In the present embodiment, since the control signal line 313 is capacitively coupled to the plurality of source lines 102, a ripple signal induced by the capacitive coupling between the source line 102 and the control signal line 313 is written to the source signal 30B while the control signal 30C is at the ON voltage level.

The control signal line 313 is capacitively coupled by, for example, overlapping some of the source lines 102.

A description is given next of the liquid crystal panel 10. The liquid crystal panel 10 includes the TFT substrate 100, the liquid crystal layer 300, and the CF substrate 200 arranged in this order from the rear face toward the viewing face. The TFT substrate 100 and the CF substrate 200 are attached together by a sealing section and spaced therebetween by a gap that is as large as the thickness of the liquid crystal layer 300. The TFT substrate 100 and the CF substrate 200 each include a highly transparent glass substrate and are formed by stacking various films on the glass substrate by, for example, a known photolithography method.

Referring to FIG. 1, the TFT substrate 100 includes the plurality of gate lines 101 and the plurality of source lines 102 in the display area 10A on a transparent substrate such as a glass substrate. The gate lines 101 extend parallel to each other in a horizontal direction (X-axis direction) for the screen. The source lines 102 extend parallel to each other in a direction that intersects with the gate lines 101 (vertical direction for the screen (Y-axis direction)) via an inorganic insulation film. The gate lines 101 and the source lines 102 are arranged to form a lattice as a whole so as to divide the pixels 10PX. The TFTs 103 are provided at the intersections of the gate lines 101 and the source line 102. The TFT substrate 100 includes pixel electrodes 104 that are disposed in regions each surrounded by neighboring two of the gate lines 101 and neighboring two of the source lines 102. The pixel electrodes 104 are electrically connected to the respective source lines 102 via a semiconductor layer in the TFTs 103. The pixel electrodes 104 are set to a voltage level in accordance with the source signal 30B supplied via the respective TFTs 103.

The TFT substrate 100 includes in the display area 10A: the transparent substrate; a gate line layer on the viewing face of the transparent substrate, the gate line layer containing the gate lines 101 and the auxiliary lines 11; an inorganic insulation layer on the viewing face of the gate line layer; and a source line layer on the viewing face of the inorganic insulation layer, the source line layer containing the source lines 102.

The CF substrate 200 has a long-side length similar to that of the TFT substrate 100 and a short-side length smaller than that of the TFT substrate 100, as shown in FIG. 1. The CF substrate 200 and the TFT substrate 100 are aligned on a side thereof with respect to the short-side direction thereof (upper side in FIG. 1) and attached together. Therefore, the TFT substrate 100 does not overlap the CF substrate 200 in a prescribed area along the other side thereof with respect to the short-side direction thereof (lower side in FIG. 1) as shown in FIG. 1, so as to expose the front and rear faces. This exposed portion is the terminal edge 10B2.

The CF substrate 200 includes: a glass substrate; a CF layer and a black matrix layer on the rear face of the glass substrate; and a common electrode on the rear face of the CF layer and the black matrix layer.

The CF layer in the CF substrate 200 includes a red color filter, a green color filter, and a blue color filter. Each pixel includes three picture elements arranged in stripes: a picture element with a red color filter, a picture element with a green color filter, and a picture element with a blue color filter. The CF layer mixes colors while controlling the quantity of the colored light transmitted by the red color filter, the green color filter, and the blue color filter, in order to generate light of a desirable color in each pixel.

The black matrix layer in the CF substrate 200 is a light-blocking member formed like a lattice that divides the red, green, and blue color filters in the color filter layer.

The common electrode is provided substantially across the entire face, overriding pixel boundaries. A common signal held at a constant level is supplied to the common electrode, so as to hold the common electrode at a constant voltage level. The common electrode is provided on the CF substrate 200 in the present embodiment and may alternately be provided on the TFT substrate 100. When the common electrode is provided on the TFT substrate 100, the common electrode may be provided in the same layer as the pixel electrodes 104 and may be provided on the viewing face or the rear face of the pixel electrodes 104 via an insulation film.

The liquid crystal layer 300 contains a liquid crystal material. The quantity of light transmitted by the liquid crystal layer 300 is controlled by applying voltage across the liquid crystal layer 300 to change the orientation of the liquid crystal molecules in the liquid crystal material in accordance with the voltage applied across the liquid crystal layer 300. The dielectric anisotropy (Δε) of the liquid crystal molecules, defined as in Eq. L below, may be either positive or negative. Those liquid crystal molecules that have positive dielectric anisotropy may be alternatively referred to as positive liquid crystal, and those that have negative dielectric anisotropy may be alternatively referred to as negative liquid crystal. The direction of the major axis of the liquid crystal molecules matches with the direction of the slow axis. The liquid crystal molecules are homogeneously oriented when no voltage is applied across the liquid crystal molecules (in the absence of applied voltage). The direction of the major axis of the liquid crystal molecules in the absence of applied voltage may be alternatively referred to as the direction of the initial orientation of liquid crystal molecules.

Δε=(permittivity in major-axis direction of liquid
crystal molecules)−(permittivity in minor-axis
direction of liquid crystal molecules) (Eq. L)

Alignment films are provided, one between the TFT substrate 100 and the liquid crystal layer 300 and another between the CF substrate 200 and the liquid crystal layer 300. Both alignment films are capable of controlling the alignment of the liquid crystal molecules in the liquid crystal layer 300. Polarizers are also attached, one to the opposite face of the TFT substrate 100 from the liquid crystal layer 300 and another to the opposite face of the CF substrate 200 from the liquid crystal layer 300.

Each of the numerous source lines 102 is connected to a particular one of the source drivers 120 depending on the X-axis-wise position thereof in the display area 10A as shown in FIG. 2. In other words, when the display area 10A is divided into eight display area segments along the X-axis, that is, the first display area segment 10A1, the second display area segment 10A2, the third display area segment 10A3, the fourth display area segment 10A4, the fifth display area segment 10A5, the sixth display area segment 10A6, the seventh display area segment 10A7, and the eighth display area segment 10A8 (sequentially from left to right in FIG. 2), the eight source drivers 120 are connected to the respective groups of source lines 102 in the first display area segment 10A1 to the eighth display area segment 10A8 to supply image signals to the respective groups of source lines 102 in the first display area segment 10A1 to the eighth display area segment 10A8. In FIG. 2, a dash-dot line indicates the outline of the display area 10A, and the dash-double-dot lines indicate the boundaries of the display area segments 10A1 to 10A8.

The gate driver 110 supplies the gate signal 30A to the gate lines 101 sequentially under the control of the control unit 310. The source driver 120 supplies the source signal 30B to the source lines 102 when the TFTs 103 are turned on in response to the gate signal 30A (voltage application state), under the control of the control unit 310. The pixel electrodes 104 are set to a voltage level in accordance with the source signal 30B supplied via the associated one of the TFTs 103. That in turn generates an electric field between the pixel electrode 104 and the common electrode, which enables control of the orientation of the liquid crystal molecules in the liquid crystal layer 300. Then, in each pixel 10PX in the liquid crystal panel 10, the optical transmittance of the liquid crystal layer 300 is adjusted for an image display by changing the orientation of the liquid crystal molecules through the magnitude of the voltage applied across the liquid crystal layer 300.

The liquid crystal display device 1 in accordance with the present embodiment, as shown in FIG. 2, includes the auxiliary lines 11 for repairing a break in the source line 102. The auxiliary lines 11 are routed straddling the non-display area 10B, the flexible substrates 20, and the printed board 30 on the TFT substrate 100. A description is given below of how a break in the source line 102 is corrected using the auxiliary line 11.

Figure 8:
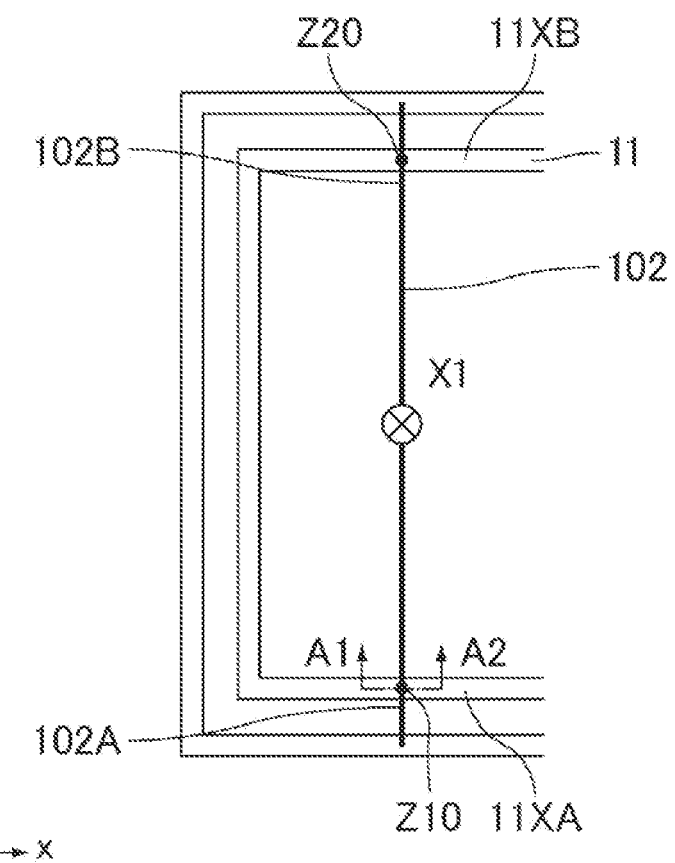
FIG. 8 is a schematic plan view illustrating how a break in a source line is corrected in a liquid crystal display device in accordance with an embodiment.
Figure 9:
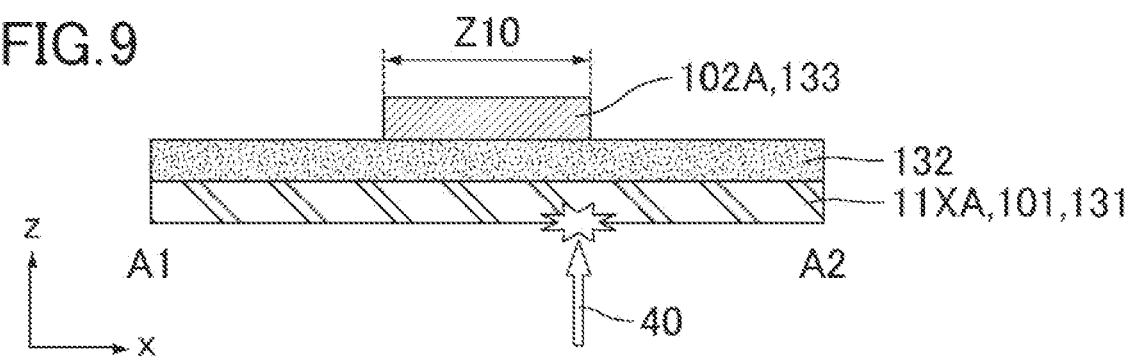
FIG. 9 is a schematic cross-sectional view of a break in a source line in the liquid crystal display device in accordance with the embodiment being placed under laser radiation for correction.
Figure 10:
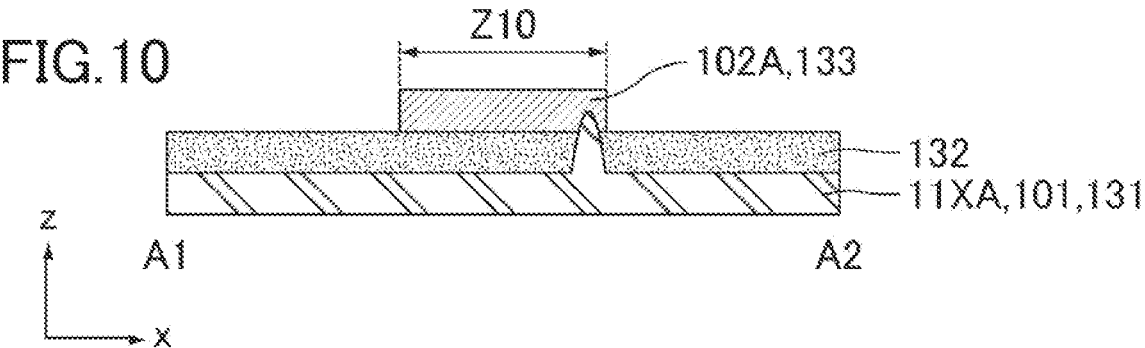
FIG. 10 is a schematic cross-sectional view of a break in a source line in the liquid crystal display device in accordance with the embodiment having been irradiated with laser radiation for correction.
Figure 11:
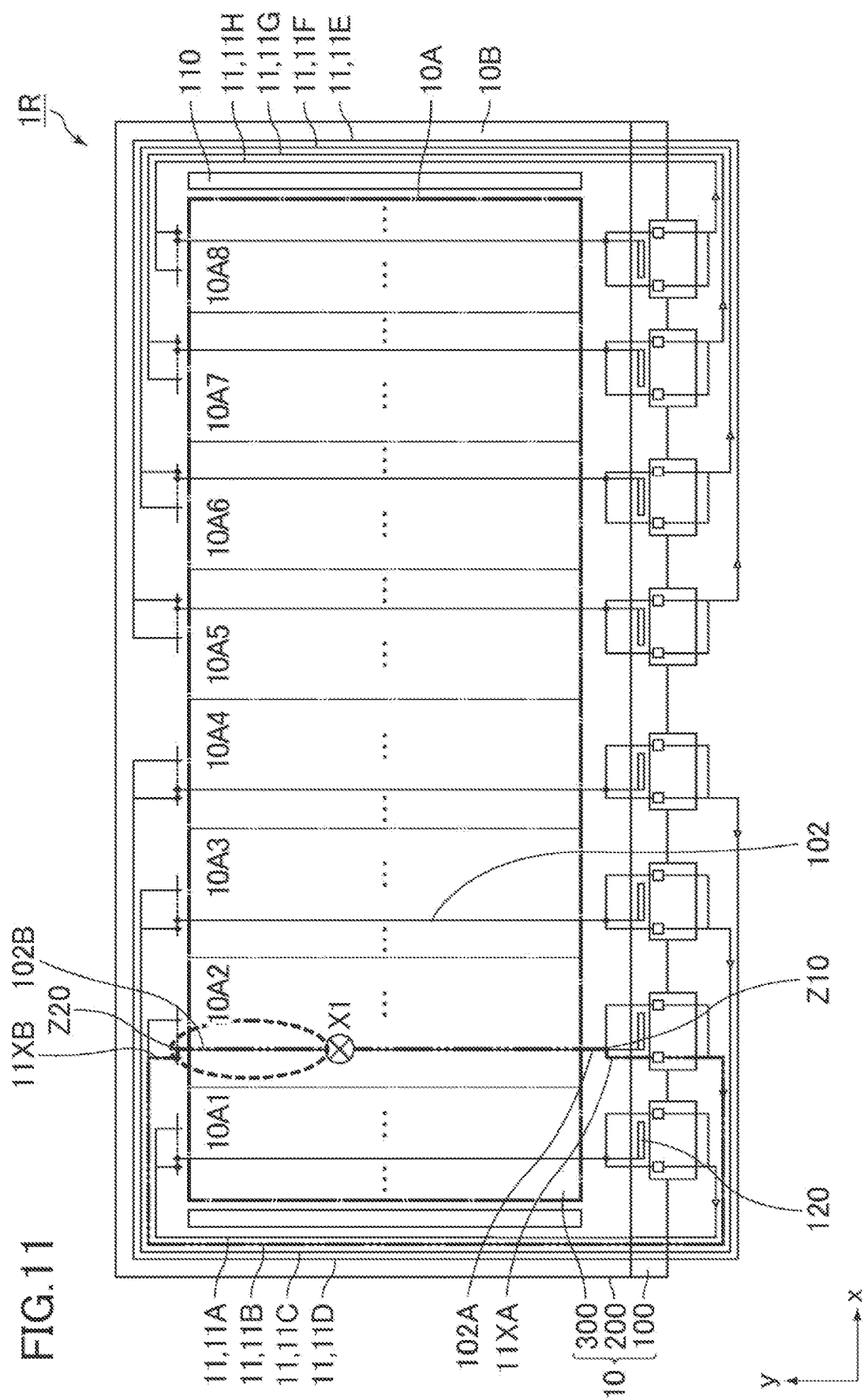
FIG. 11 is a schematic plan view of a liquid crystal display device in accordance with a comparative embodiment.

FIG. 8 is a schematic plan view illustrating how a break in a source line is corrected in a liquid crystal display device in accordance with an embodiment. FIG. 9 is a schematic cross-sectional view of a break in a source line in the liquid crystal display device in accordance with the embodiment being placed under laser radiation for correction. FIG. 10 is a schematic cross-sectional view of a break in a source line in the liquid crystal display device in accordance with the embodiment having been irradiated with laser radiation for correction. The schematic cross-sectional views in FIGS. 9 and 10 are taken along line A1-A2 in FIG. 8.

The TFT substrate 100, as shown in FIGS. 8 and 9, includes: a gate line layer 131 containing the plurality of gate lines 101 and the plurality of auxiliary lines 11 on a glass substrate; an inorganic insulation film 132; and a source line layer 133 containing the plurality of source lines 102 in this order.

The gate line layer 131 and the source line layer 133 may be made of any material and are preferably made of a metal. The gate line layer 131 and the source line layer 133 are preferably metal layers. The gate line layer 131 and the source line layer 133 may be a single layer of a single material or a stack of layers including adjacent layers of different materials. Each of the gate line layer 131 and the source line layer 133 may be, for example, a layer containing titanium (Ti), a layer containing copper (Cu), or a stack of such layers.

The inorganic insulation film 132 may be, for example, an insulation film of an inorganic material such as silicon nitride ($SiN_x$), silicon oxide ($SiO_2$), or silicon nitride oxide (SiNO) or a stack of such films.

The auxiliary line 11 has a first end 11XA overlapping the first end 102A of the source line 102 via the inorganic insulation film 132 in the overlapping region Z10 and has a second end 11XB overlapping the second end 102B of the source line 102 via the inorganic insulation film 132 in the overlapping region Z20. Therefore, when the source line 102 has the discontinuous section X1, the auxiliary line 11 can be short-circuited to the source line 102 as indicated by a circle in FIG. 10 by, for example, shining a laser beam 40 onto the overlapping region Z10 where the first end 11XA of the auxiliary line 11 overlaps the first end 102A of the source line 102 and the overlapping region Z20 where the second end 11XB of the auxiliary line 11 overlaps the second end 102B of the source line 102. This short-circuiting enables the source signal 30B to be supplied from the source driver 120 to the part of the source line 102 that is beyond the discontinuous section X1 via the auxiliary line 11. The broken source line 102 is hence repaired.

Referring to FIG. 2, the source drivers 120 are disposed in the non-display area 10B, in particular, along the terminal edge 10B2, and connected to the first ends 102A of the source lines 102. The auxiliary line 11 extends in the non-display area 10B from the first end 102A of the source line 102 to the second end 102B of the source line 102 and overlaps the second end 102B of the source line 102.

The auxiliary line 11 extends in the non-display area 10B from the first end 102A of the source line 102 via the display area 10A to an opposite side from the source driver 120. To describe it in more detail, the auxiliary line 11 extends in the X-axis direction in the non-display area 10B of the source driver 120 on the TFT substrate 100 so as to intersect with the first end 102A of the source line 102 via the inorganic insulation film 132, before being bent and connected to an the auxiliary-line-use terminal section 20A. The auxiliary line 11 extends from the auxiliary-line-use terminal section 20A, passing through one of the flexible substrates 20 mounted for the respective display area segments 10A1 to 10A8 and then through the printed board 30.

The auxiliary line 11 extends toward an X-axis-wise edge of the printed board 30 and then passes through the flexible substrate 20 located along the X-axis-wise edge. The auxiliary line 11 is then connected to the auxiliary-line-use terminal section 20A near the X-axis-wise edge (corner) of the TFT substrate 100 as shown in FIG. 2 before extending in the Y-axis direction toward an opposite side from the source driver 120 in the non-display area 10B of the TFT substrate 100. The auxiliary line 11 extends in the X-axis direction toward the inner side of the surface of the liquid crystal panel 10 via the display area 10A in the non-display area 10B located opposite the source driver 120, then extends in the Y-axis direction toward the display area 10A, and extends in the X-axis direction in the non-display area 10B opposite the display area 10A from the source driver 120 so as to intersect with the second end 102B of the source line 102 via the inorganic insulation film 132.

When the source line 102 has the discontinuous section X1, the auxiliary line 11 can be short-circuited to the source line 102 by, for example, shining the laser beam 40 onto the overlapping region Z10 where the first end 11XA of the auxiliary line 11 overlaps the first end 102A of the source line 102 and the overlapping region Z20 where the second end 11XB of the auxiliary line 11 overlaps the second end 102B of the source line 102. This short-circuiting enables the source signal 30B to be supplied from the source driver 120 to the part of the source line 102 that is beyond the discontinuous section X1 via the auxiliary line 11. The broken source line 102 is hence repaired. When the auxiliary line 11 includes a plurality of overlapping (intersecting) wiring sections disposed in different wiring layers, these overlapping regions are also fused under a laser.

Each auxiliary line 11 is associated with a different one of the eight display area segments 10A1 to 10A8 of the display area 10A (hence there is provided a total of eight auxiliary lines 11). Specifically, the auxiliary lines 11 includes the first auxiliary line 11A for repairing the source lines 102 in the first display area segment 10A1, the second auxiliary line 11B for repairing the source lines 102 in the second display area segment 10A2, the third auxiliary line 11C for repairing the source lines 102 in the third display area segment 10A3, the fourth auxiliary line 11D for repairing the source lines 102 in the fourth display area segment 10A4, the fifth auxiliary line 11E for repairing the source lines 102 in the fifth display area segment 10A5, the sixth auxiliary line 11F for repairing the source lines 102 in the sixth display area segment 10A6, the seventh auxiliary line 11G for repairing the source lines 102 in the seventh display area segment 10A7, and the eighth auxiliary line 11H for repairing the source lines 102 in the eighth display area segment 10A8.

The first auxiliary line 11A, the second auxiliary line 11B, the third auxiliary line 11C, and the fourth auxiliary line 11D are routed so as to pass through the left short-side of the liquid crystal panel 10 shown in FIG. 3, whereas the fifth auxiliary line 11E, the sixth auxiliary line 11F, the seventh auxiliary line 11G, and the eighth auxiliary line 11H are routed to so as to pass through the right short-side of the liquid crystal panel 10 shown in FIG. 3.

Of the first auxiliary line 11A to the fourth auxiliary line 11D routed parallel to each other, the first auxiliary line 11A is positioned most internally, and the fourth auxiliary line 11D is positioned most externally. Likewise, of the fifth auxiliary line 11E to the eighth auxiliary line 11H routed parallel to each other, the eighth auxiliary line 11H is positioned most internally, and the fifth auxiliary line 11E is positioned most externally. Of the creepage distances (wire lengths) of the auxiliary lines 11A to 11H, those of the first auxiliary line 11A and the eighth auxiliary line 11H associated with the externally positioned display area segments 10A1 and 10A8 are the shortest, and those of the fourth auxiliary line 11D and the fifth auxiliary line 11E associated with the internally positioned display area segments 10A4 and 10A5 are the longest.

Each flexible substrate 20 includes a film-like, insulating and flexible base member and a pattern of numerous wires on the base member. The base member is primarily composed of a synthetic resin material (e.g., polyimide-based resin). In the present embodiment, the eight flexible substrates 20 are disposed side by side with an interval in the X-axis direction along the long-side edge (terminal edge 10B2) of the liquid crystal panel 10 where the non-display area 10B is present.

The printed board 30 is a control board for controlling various signals (the gate signal 30A, the source signal 30B, and the control signal 30C) and includes the control unit 310 which in turn includes the timing controller 311 and a level shifter 312 as shown in FIG. 1. The control unit 310 feeds various signals to the gate drivers 110 and the source drivers 120 via the control signal line 313.

The printed board 30 includes an insulating rigid substrate, as well as a pattern of numerous wires and various electronic components all provided on the insulating rigid substrate. The insulating rigid substrate is primarily composed of a synthetic resin material. The printed board 30 has a length approximately equal to the long side of the TFT substrate 100 and is connected to the opposite edges of the eight flexible substrates 20 from the TFT substrate 100. The printed board 30 includes a terminal section that is connected to the terminal sections of the flexible substrates 20 via an ACF.

The timings of the driving operations of the gate drivers 110 and the source drivers 120 are controlled by the timing controller 311. The timing controller 311 outputs a gate start pulse signal (hereinafter, may be referred to as a "GSP") for controlling the timings of starting the GCK and the gate signal 30A, to control timings for the gate drivers 110. The timing controller 311 also outputs the control signal 30C for switching the source signal 30B to control timings for the source drivers 120. The level shifter 312 generates signals for stepping up various signals and also generates, from the GCK, signals in phase, signals in opposite phase, and signals for a phase shift.

While there have been described what are at present considered to be certain embodiments of the application, it will be understood that various modifications may be made thereto, and it is intended that the appended claim cover all such modifications as fall within the true spirit and scope of the application.

What is claimed is:
1. A liquid crystal display device comprising:
a display area in which there is provided a matrix of pixels;
a non-display area around the display area;
a plurality of gate lines extending along respective rows of pixels;
a plurality of source lines extending along respective columns of pixels in a direction that intersects with the plurality of gate lines;
a plurality of thin film transistors, one for each pixel, connected respectively to the plurality of gate lines and the plurality of source lines;
a gate driver connected to the plurality of gate lines to sequentially supply a plurality of gate signals to the plurality of gate lines;
a source driver connected to an end of each of the plurality of source lines to supply a plurality of source signals to the plurality of source lines respectively;

control circuit configured to supply a control signal to the source driver via a control signal line, the control signal being a pulse signal for switching the plurality of source signals; and an auxiliary line extending in the non-display area from an end of one of the plurality of source lines to another end thereof, wherein each of the plurality of thin film transistors is turned on and off when one of the plurality of gate signals supplied to one of the plurality of gate lines connected to the each of the thin film transistors changes to an ON voltage level and an OFF voltage level respectively, and the control signal is different from a clock signal that is input to the gate driver, and is a signal that is supplied from the control circuit to the source driver, and a potential of the source signal switches after the control signal rises at a different timing from a fall in one of the plurality of gate signals.

2. The liquid crystal display device according to claim 1, wherein the control signal reaches half an amplitude thereof while rising at a different timing from a timing when one of the plurality of gate signals reaches half an amplitude thereof while falling.

3. The liquid crystal display device according to claim 1, wherein the control signal rises at a timing outside a gate falling period in which one of the plurality of gate signals changes from the ON voltage level to the OFF voltage level.

4. The liquid crystal display device according to claim 3, wherein the control signal changes to the ON voltage level in a period outside the gate falling period.

5. The liquid crystal display device according to claim 1, wherein each of the plurality of source signals is switched between voltage levels in response to the control signal changing from the ON voltage level to the OFF voltage level.

6. The liquid crystal display device according to claim 5, wherein each of the plurality of source signals changes from a voltage level written to the pixels in an n-th one of the rows to a voltage level written to the pixels in an (n+1)-th one of the rows in response to the control signal rising and then falling after a fall in one of the plurality of gate signals supplied to one of the plurality of gate lines for the n-th one of the rows, where n is a natural number.

7. The liquid crystal display device according to claim 1, wherein the control signal line is capacitively coupled to the plurality of source lines.

* * * * *